United States Patent Office 2,945,053
Patented July 12, 1960

2,945,053

PHOSPHOROTHIOLOTHIONATES DERIVED FROM ESTERS OF HALOGEN-CONTAINING ACIDS

Richard L. McConnell and Thomas H. Wicker, Jr., Kingsport, Tenn., assignors to Eastman Kodak Company, Rochester, N.Y., a corporation of New Jersey No Drawing. Filed Dec. 16, 1957, Ser. No. 702,813

8 Claims. (Cl. 260—461)

This invention relates to new organophosphorus compounds and to their method of preparation. In a specific aspect this invention relates to the preparation of new organophosphorus compounds by the reaction of dialkyl phosphorothiolothionates or a salt thereof with certain esters of halogen-containing acids and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting dialkyl phosphorothiolothionates or a salt thereof with certain esters of halogen-containing acids. The new products of this invention have the structural formula:

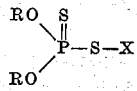

wherein R is a lower alkyl radical containing 1–4 carbon atoms and X is selected from the group consisting of:

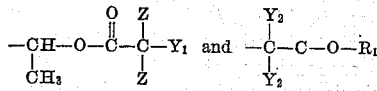

wherein $Y_1$ is a halogen atom, Z is selected from the group consisting of hydrogen and halogen atoms, $Y_2$ is a halogen atom selected from the group consisting of chlorine and bromine and $R_1$ is selected from the group consisting of vinyl and ethyl.

The new products of this invention are formed by reacting a dialkyl phosphorothiolothionate or an ammonium or alkali metal salt thereof with the vinyl ester of a haloacetate. When the ammonium or alkali metal salt of the dialkyl phosphorothiolothionate is one of the reactants, it is possible to use the ethyl ester of the haloacetate as the other reactant. The products are produced in accordance with the following equations:

(I)
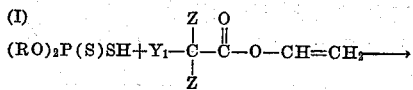

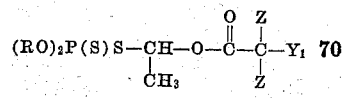

(II)
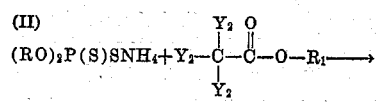

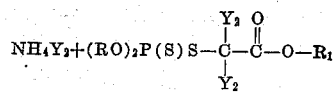

In Equations I and II, R, $R_1$, $Y_1$, $Y_2$ and Z are as defined above.

In the practice of this invention we prefer to add one of the reactants gradually to a reactor containing the other reactant. For example, the ester can be added gradually to a reactor containing the dialkylphosphorothiolothionate. Alternatively however, the reverse procedure of addition of reactants can be used and the dialkylphosphorothiolothionate can be added to a reactor containing the ester. When the halogen atoms present in the ester of a halogen-containing acid are chlorine or bromine, the phosphorothiolothionate must be added to the ester. The reaction represented by equation II is usually carried out by refluxing a mixture of the reactants in an anhydrous lower aliphatic alcohol or ketone. Normally it is desirable to employ a reactor provided with adequate means of agitation and, since the reaction is quite exothermic, it is also desirable to employ a reactor that is provided with adequate cooling means.

The operable temperature range for the reaction is generally from −25 to 150° C. and the preferred temperature range is from 25 to 125° C. However, it will be realized that in some instances temperatures outside this range can be employed. The reaction time usually varies from 1 to 8 hours, but longer and shorter reaction periods are sometimes used. Normally it is unnecessary to employ a catalyst for the reaction since the dialkylphosphorothiolothionate or its salts will react with the ester in the absence of a catalyst. If it is considered desirable to employ a catalyst, the tertiary amines, such as triethyl amine, and the like, can be used.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants, but other ratios of reactants can be used effectively.

The following examples are illustrative of the compounds within the scope of this invention, their method of preparation and their utility as insecticides.

*Example 1.—O,O-diethyl S-1-(trichloroacetoxy)ethyl phosphorothiolothionate*

$$CCl_3COOCH(CH_3)SP(S)(OC_2H_5)_2$$

Diethyl phosphorothiolothionate (0.1 mole) was added dropwise with stirring to vinyl trichloroacetate (0.1 mole). The reaction mixture was stirred for 30 minutes and then heated gently on the steam bath for 30 minutes. The crude product was allowed to cool to 25° C. and then placed under reduced pressure (1–2 mm.) to remove volatile impurities. The product was a yellow transparent oil which was pure enough for use as an insecticide without further purification.

*Example 2.—O,O-diethyl S-1-(tribromoacetoxy)ethyl phosphorothiolothionate*

$$CBr_3COOCH(CH_3)SP(S)(OC_2H_5)_2$$

This compound was prepared from diethyl phosphorothiolothionate (0.1 mole) and vinyl tribromoacetate (0.1 mole) according to the procedure of Example 1.

*Example 3.—O,O-diethyl S-1-(trifluoroacetoxy)ethyl phosphorothiolothionate*

$$CF_3COOCH(CH_3)SP(S)(OC_2H_5)_2$$

This compound was prepared from diethyl phosphorothiolothionate (0.1 mole) and vinyl trifluoroacetate (0.1 mole) according to the procedure of Example 1.

*Example 4.—O,O,-dimethyl S-1-(dichloroacetoxy)ethyl phosphorothiolothionate*

$$CHCl_2COOCH(CH_3)SP(S)(OCH_3)_2$$

This compound was prepared from dimethyl phosphorothiolothionate (0.1 mole) and vinyl dichloroacetate according to the procedure of Example 1.

*Example 5.—O,O-diisopropyl S-1-(bromoacetoxy)ethyl phosphorothiolothionate*

$$BrCH_2COOCH(CH_3)SP(S)[OCH(CH_3)_2]_2$$

This compound was prepared from diisopropyl phosphorothiolothionate (0.1 mole) and vinyl bromoacetate according to the procedure of Example 1.

*Example 6.—O,O-diethyl S-(dichloro)(vinyloxycarbonyl)methyl phosphorothiolothionate*

$$(C_2H_5O)_2P(S)SCCl_2COOCH=CH_2$$

The potassium salt of diethyl phosphorothiolothionate (0.1 mole) and vinyl trichloroacetate (0.1 mole) were placed in 100 ml. of absolute ethanol and refluxed for 6 hours. The precipitated potassium chloride was removed by filtration, and the ethanol was removed by distillation. The residual oil was dissolved in 100 cc. of ether and washed with water. After drying the ether layer over sodium sulfate, the ether was distilled off leaving the product as an oil.

*Example 7.—O,O-diethyl S-(dibromo)(vinyloxycarbonyl)methyl phosphorothiolothionate*

$$(C_2H_5O)_2P(S)SCBr_2COOCH=CH_2$$

This compound was prepared from the ammonium salt of diethyl phosphorothiolothionate (0.1 mole) and vinyl tribromoacetate in refluxing acetone according to the procedure of Example 6.

*Example 8.—O,O-diethyl S-(dichloro)(ethoxycarbonyl)methyl phosphorothiolothionate*

$$(C_2H_5O)_2P(S)SCCl_2COOC_2H_5$$

This compound was prepared from the ammonium salt of diethyl phosphorothiolothionate (0.1 mole) and ethyl trichloroacetate in refluxing absolute ethanol according to the procedure of Example 6.

*Example 9.—O,O-diethyl S-1(chloroacetoxy)ethyl phosphorothiolothionate*

$$ClCH_2COOCH(CH_3)SP(S)(OC_2H_5)_2$$

Vinyl chloroacetate (0.1 mole) and diethyl phosphorothiolothionate were mixed with stirring. Then 3 drops of triethylamine was added and the reaction mixture was stirred for 1½ hours. The reaction product was placed under reduced pressure (1 mm.) at 25° C. to remove volatile impurities. The compound is a yellow oil, $n_D^{20}$ 1.5060.

*Example 10.—Use of compounds as insecticides*

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites. It should be noted that tests using acetone-water solutions (containing none of the toxicant) kill none of the mites.

| Toxicant | Concentration of toxicant in p.p.m. | Percent Kill Mites |
| --- | --- | --- |
| 1. Product of Ex. 1 | 100 | 98 |
| 2. Product of Ex. 8 | 100 | 100 |

The compounds illustrated by Examples 2 through 7 and Example 9 were similarly effective when tested in the above manner.

We claim:

1. Organophosphorus compounds having the structural formula:

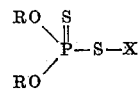

wherein R is a lower alkyl radical and X is selected from the group consisting of:

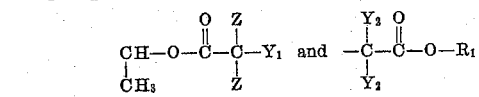

wherein $Y_1$ is a halogen atom, Z is selected from the group consisting of hydrogen and halogen atoms, $Y_2$ is a halogen atom selected from the group consisting of chlorine and bromine and $R_1$ is selected from the group consisting of vinyl and ethyl.

2. Organophosphorus compounds having the structural formula:

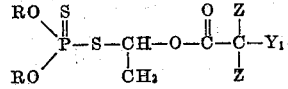

wherein R is a lower alkyl radical, Z is selected from the group consisting of hydrogen and halogen atoms and $Y_1$ is a halogen atom.

3. Organophosphorus compounds having the structural formula:

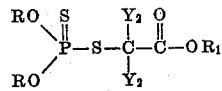

wherein R is a lower alkyl radical, $R_1$ is selected from the group consisting of vinyl and ethyl and $Y_2$ is a halogen atom selected from the group consisting of chlorine and bromine.

4. As a composition of matter, O,O-diethyl S-1-(trichloroacetoxy)ethyl phosphorothiolothionate.

5. As a composition of matter, O,O-diethyl S-(dichloro)(vinyloxycarbonyl)methyl phosphorothiolothionate.

6. As a composition of matter, O,O-diethyl S-(dibromo)(vinyloxycarbonyl)methyl phosphorothiolothionate.

7. As a composition of matter, O,O-diethyl S-(dichloro)(ethoxycarbonyl)methyl phosphorothiolothionate.

8. As a composition of matter, O,O-diethyl S-1-(chloroacetoxy)ethyl phosphorothiolothionate.

References Cited in the file of this patent

FOREIGN PATENTS 1,133,785    France _____ Nov. 19, 1956

OTHER REFERENCES

Mel'Nikov et al.: Chem. Abst., vol. 48, col. 556–7 (1954).

Melnikov et al.: J. Gen. Chem., U.S.S.R., 23, pp. 1418, 1420 (1953).

Geigy: German application Ser. No. G 14,948, printed July 26, 1956 (K 12₀23₀3).

UNITED STATES PATENT OFFICE
CERTIFICATE OF CORRECTION

Patent No. 2,945,053                  July 12, 1960

Richard L. McConnell et al.

It is hereby certified that error appears in the printed specification of the above numbered patent requiring correction and that the said Letters Patent should read as corrected below.

Column 1, lines 48 to 51, for that portion of the formula reading

Signed and sealed this 31st day of January 1961.

(SEAL)
Attest:

KARL H. AXLINE
Attesting Officer

ROBERT C. WATSON
Commissioner of Patents